United States Patent
Szynka

[11] 3,708,048
[45] Jan. 2, 1973

[54] FLUID PRESSURE CLUTCH WITH EMERGENCY SCREW OPERATOR

[75] Inventor: Peter Szynka, Witten, (Ruhr), Germany

[73] Assignee: Lohmann & Stollerfoht Aktiengesellschaft, Wittenburg/Ruhr, Germany

[22] Filed: March 22, 1971

[21] Appl. No.: 126,927

[30] Foreign Application Priority Data

March 25, 1970 Germany..................P 20 15 501.5

[52] U.S. Cl. ..................192/83, 192/85 AB, 192/70
[51] Int. Cl. ...............................................F16d 19/00
[58] Field of Search......192/85 C, 85 AT, 85 AB 85 AA, 192/84 AA, 83, 105 C, 41

[56] References Cited

UNITED STATES PATENTS

| | | | |
|---|---|---|---|
| 1,232,132 | 7/1917 | Ward | 192/41 R |
| 1,360,394 | 11/1920 | Gordon | 192/85 AA |
| 1,743,170 | 1/1930 | Vail | 192/105 C |
| 3,262,529 | 7/1966 | Kramer | 192/83 |

FOREIGN PATENTS OR APPLICATIONS

| 1,010,393 | 11/1965 | Great Britain | 192/85 AB |
|---|---|---|---|

Primary Examiner—Benjamin W. Wyche
Assistant Examiner—Randall Heald
Attorney—Smyth, Roston & Pavitt and Ralf H. Siegemund

[57] ABSTRACT

An emergency device for a pressure fluid operated double cone friction clutch, particularly as used in a ship drive system, is provided in that the pressure fluid operated parts can be mechanically moved through physical engagement in case of failure of the fluid system.

6 Claims, 6 Drawing Figures

FLUID PRESSURE CLUTCH WITH EMERGENCY SCREW OPERATOR

The present invention relates to improvements of clutches operated normally by pressurized fluid. The invention relates particularly to improvements in highly elastic double cone friction clutches of the heavy duty type as used, for example, in drive and propulsion systems for ships.

Clutches of the type referred to above, are often used to connect a driving shaft to a driven shaft. There is usually provided a clutch housing that is coupled to the driven shaft of the particular torque transmission system, and the housing is particularly provided with two inside conical surfaces. A mating clutch element is disposed in and coaxially to the housing and is comprised of two parts with outer conical surfaces. Resilient coupling connects these two parts to the drive shaft. Thus, this two part clutch element is the driven portion of the resilient coupling as coupled to the drive shaft, while being the drive part of the clutch. These two internal clutch parts are axially movable relative to each other for placement into and out of frictional engagement with the housing.

In order to obtain clutch operation, one of the internal clutch parts is connected to a cylinder and the other one to a piston moving in that cylinder. As the interior of the cylinder chamber is pressurized, the two inner clutch parts are resiliently spread apart in axial direction, the fluid pressure acting against the resilient reaction of the coupling. Upon being so spread the cone surfaces of the inner clutch elements bear against the cone surfaces of the clutch housing, there being friction lining interposed.

It now has to be observed that the clutch may become inoperative; particularly the fluid pressure may drop, or the fluid system may fail otherwise, or the clutch operating and actuating mechanism may be damaged. In either case, the clutch would become inoperable; the two shafts would no longer be connected, as spring pressure forces the clutch into a disengaging position. There is then the need for providing emergency equipment which, in fact, provides emergency interconnection between driving and driven parts of the clutch so that torque can be transmitted between driving and driven shafts. It is particularly desirable to provide such an emergency or fail safe device which can readily be installed in already existing clutches. The problem was particularly encountered in torque transmission systems as used for and in ships.

An emergency arrangement has been developed previously and built by assignee corporation in which the drive part of the resilient coupling for the internal clutch element was directly, mechanically connected to the driven part of the clutch, thus, bypassing the resilient coupling for torque transmission. For this purpose, the clutch housing was provided with a special flange construction; an intermediate flange was likewise provided especially for this purpose and particularly on the drive sleeve for the coupling. The two flanges were then bolted together to establish direct coupling between the shafts. This arrangement had the disadvantage that the elastic properties of the coupling within the clutch construction was no longer used and operative, as that resilient coupling was now bypassed. Moreover, the clutch construction itself required modification from existing clutch constructions, and putting the emergency coupling into operation required extensive assembly and installation procedures by the time the emergency situation arises.

It is an object of the present invention to provide an emergency mechanism in pressure fluid operated clutches which can be put into operation readily, for example, upon loss in fluid pressure and whereby upon completion of the emergency connection the resiliency of the resilient coupling portion of the clutch remains operative. It is a particular object of the invention to restore frictional engagement of the clutch elements even after the pressure fluid has in fact dropped out. Herein, the emergency device in accordance with the invention, should not be limited to transfer of a particular torque, but the torque to be transmitted should be adjustable. Finally, the entire emergency equipment should be constructed in such a manner so that clutches as they are already installed and in operation, but without such emergency devices, may subsequently be so equipped.

In accordance with the preferred embodiment of the present invention, it is suggested to provide emergency structure for pressure fluid operated clutches in that those parts that are normally immediately and directly actuated by the pressure fluid are to be made mechanically operable and displaceable through stand-by actuating means.

For example, the clutch may be provided with particular parts which are resiliently coupled to the drive shaft and which are hydraulically spread apart for normal operation of engagement with the driven portion (or the drive shaft) of the clutch. Cylinder and piston type arrangement is provided accordingly and respectively connected to and part of the two clutch parts to be spread apart. The cylinder is now to be provided with one or several bores respectively receiving plungers. Each plunger is normally disengaged from the piston by operation of fluid pressure, but can be manipulated externally, for example, by means of a threaded bolt or adjusting screw, pushing the plunger into the piston chamber and into engagement with the piston. As the plunger is pushed further, the piston is displaced and actuated within the cylinder, without pressure fluid acting on the piston surface. Therefore, the plunger simulates, e.g., normal actuation of the clutch so that all of the remaining construction elements of the clutch including, for example, the friction parts and the elastic coupling remains, in fact, in the torque transmission path.

The invention will find particular utility when practiced in double cone friction clutches. The piston and cylinder portions have annular, coaxial configuration, and plural plungers may be disposed respectively in plural axial bores arranged in a circle on the annular cylinder. Each plunger is preferably operated by a threaded adjusting bolt which is normally disengaged from the plunger and separately stored, for example, in a blind bore provided in a suitable place of the clutch construction. The plunger is preferably sealed within its receiving bore to prevent leakage from the cylinder chamber into which the plunger may project when used. O-rings should be used for sealing. This sealing does not prevent axial movement of the plunger in the bore.

Each plunger and receiving bore is provided with a shoulder, and the two shoulders engage each other to retain the plunger in the bore when acted upon by fluid pressure. In case of pressure drop requiring emergency connection, the plunger is lifted off the shoulder of the bore by means of the externally applied adjusting bolt. Upon turning the bolt, the plunger will engage and actuate the piston as described.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figure 1:
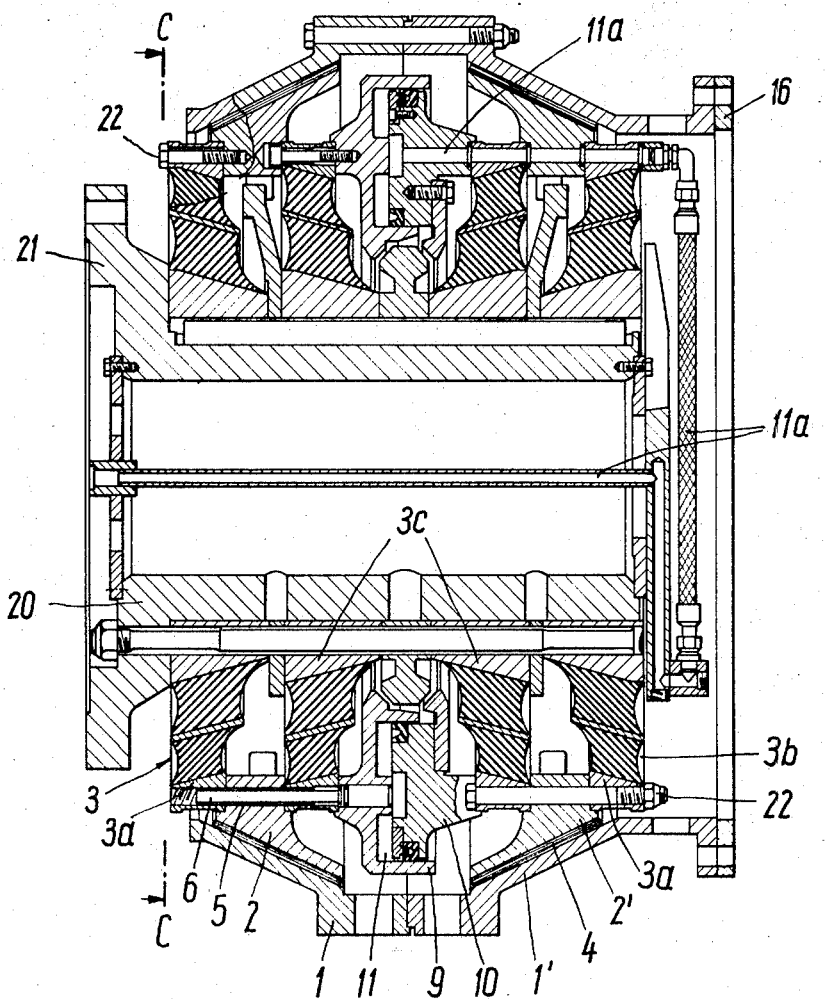
FIG. 1 illustrates a longitudinal section view through a clutch improved in accordance with the preferred embodiment of the present invention, the section plane actually being taken along line A—A of FIG. 5.
Figure 2:
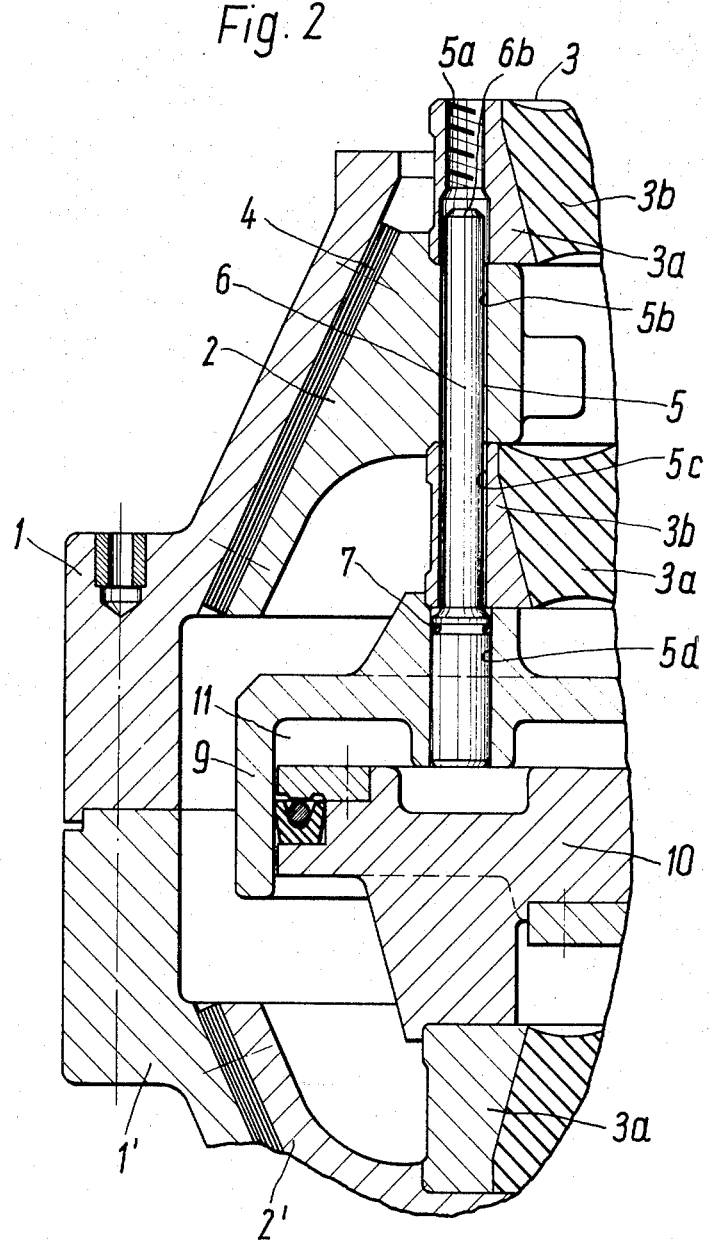
FIG. 2 is an enlarged, partial section view in a similar plane showing detailed features of the emergency construction in accordance with the invention, but in stand-by position.

Proceeding to the detailed description of the drawings, I refer particularly to the section view of FIGS. 1 and 2, illustrating a highly elastic twin-cone friction clutch having a two part housing 1 and 1' bolted to each other, part 1' extending from a flange 16. Flange 16 is provided for securing this driven, output portion of the clutch to the driven shaft (not shown). The housing has two inner surfaces developed as coaxial frustocones. These inner conical surfaces correspond to respective outer cone surfaces of two axially displaceable clutch parts 2 and 2', constituting the inside element of the clutch. These two cone surfaces of parts 2 and 2' are provided with friction lining 4.

The drive input of the clutch assembly as a whole is provided through a sleeve 20 having a flange 21 for bolting to a corresponding flange on a drive shaft (not shown). The two part element, 2, 2', that is the drive input proper of the clutch, is connected to sleeve or hub 20 by means of a four part highly resilient, metal-rubber-metal coupling 3. Each coupling part has an inner driving ring 3c, an outer driven ring 3b, and rubber coupling elements 3a interposed between two rings 3b and 3c. The rings 3b collectively constitute the driven output of the resilient clutch but constitute also part of the driving input for the clutch proper. For this, respective two rings 3b are rigidly secured to one of the inner clutch parts, e.g. 2, the other two rings 3b being secured to the other, inner clutch part 2'.

One of the rings 3a serves also as support for a cylinder 9, mounting that cylinder on clutch part 2. Another one of the rings 3a serves correspondingly as support for a piston 10, mounting that piston on clutch part 2'. Thus, clutch parts 2 and 2' are respectively secured to the annular cylinder 9 and the annular piston 10. Cylinder 9 receives piston 10 there being defined a piston chamber 11 accordingly.

Upon charging piston chamber 11 with a pressurized fluid via a conduit system 11a, the two displaceable clutch elements 2 and 2' are axially displaced in opposite direction and against resilient reaction of the several rubber elements 3b in the highly resilient coupling. As a consequence of this actuation, the cone surfaces of elements 2 and 2' are urged against the respectively mating cone surfaces of the clutch housing to obtain frictional engagement therewith through friction lining 4 for torque transmission. Upon depressurizing the piston chamber, resilient reaction in coupling 3 causes the clutch to disengage.

Figure 5:
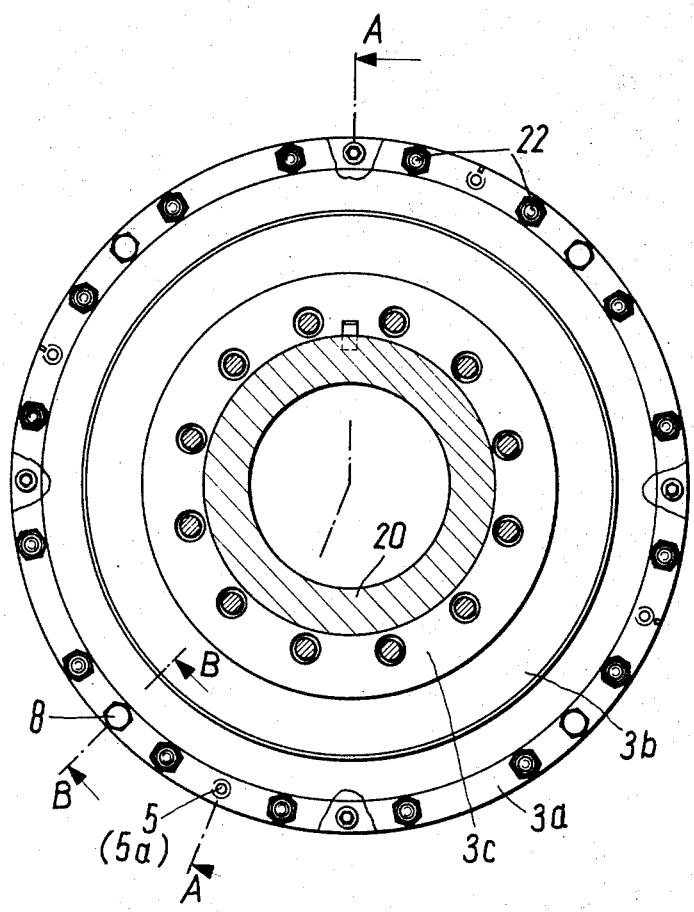
FIG. 5 is a radial section view of the clutch shown in FIG. 1; the section plane taken along line C—C of FIG. 1 to coincide with the front surface of the outer left hand elastic coupling element.
Figure 6:
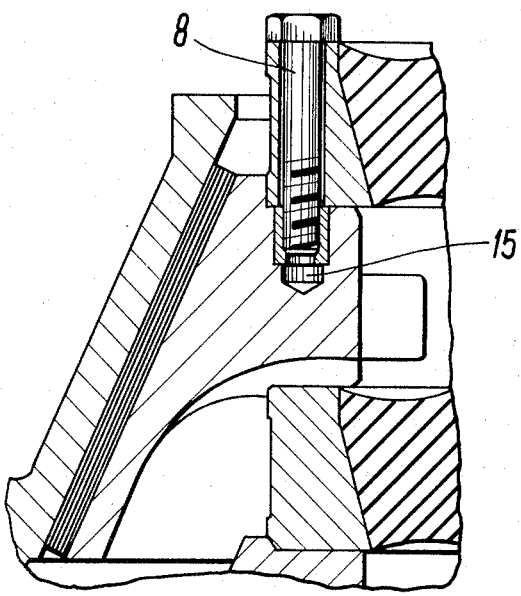
FIG. 6 illustrates a partial section view along line B—B in FIG. 5.

The clutch elements 2 and 2' are particularly secured to the several metallic outer rings 3a by means of threaded bolts 22. The centers of the threaded bores receiving these bolts as so placed define a circle. Additional axial bores are uniformly provided on that circle. In particular, there are bores 5a in the one coupling ring 3a that can be seen in FIG. 5. Each bore 5a is respectively axially aligned with a bore 5b in part 2, which, in turn, is aligned with a bore 5c in the next coupling ring 3a that supports the cylinder. A step-down or shoulder portion 5e is defined at the transition leading to bore 5d in cylinder 9 in which the bore is continued. For purposes of this description, I shall refer to a configuration of four aligned bores, 5a, 5b, 5c and 5d as a bore 5 in part 2 (or to a plurality thereof), with the understanding that each such bore 5 is actually established by four aligned bores establishing tubular passage through four different elements. Such bore begins in the axial outside plane of ring 3a as seen in FIG. 5 and terminates in cylinder chamber 11. There are four such four-aligned bores established around the center axis of the clutch in axis parallel relation, and in 90° displacement around the principle axis of the clutch.

Each bore 5 receives a plunger 6 having also a shoulder 6a. In stand-by position, plunger 6 is under fluid pressure in chamber 11 so that its shoulder 6a is urged into abutment with shoulder 5e, so as to retain the plunger in the bore. One end of plunger 6 is, thus, acted upon in piston fashion so that the plunger does not interfere with the clutch operation.

The other end 6b of a plunger 6 is somewhat receded from the corresponding other end of bore 5. The particular bore portion 5a at that end of bore 5 is provided with threading. As shown in FIG. 2, plunger end 6a is normally exposed, i.e., nothing acts on the plunger from that end when the plunger is in stand-by position. However, a protective, short shank screw may be threaded into bore 5a for closing the bore, but without actuation engagement for the plunger. It is, of course, necessary, to prevent leakage of pressure fluid along plunger 6. In order to prevent such leakage, plunger 6 is provided with a groove, particularly in the portion of largest diameter and an O-ring 7 is placed in that groove to provide sealing of the leakage path between plunger 6 and plunger 5.

Figure 3:
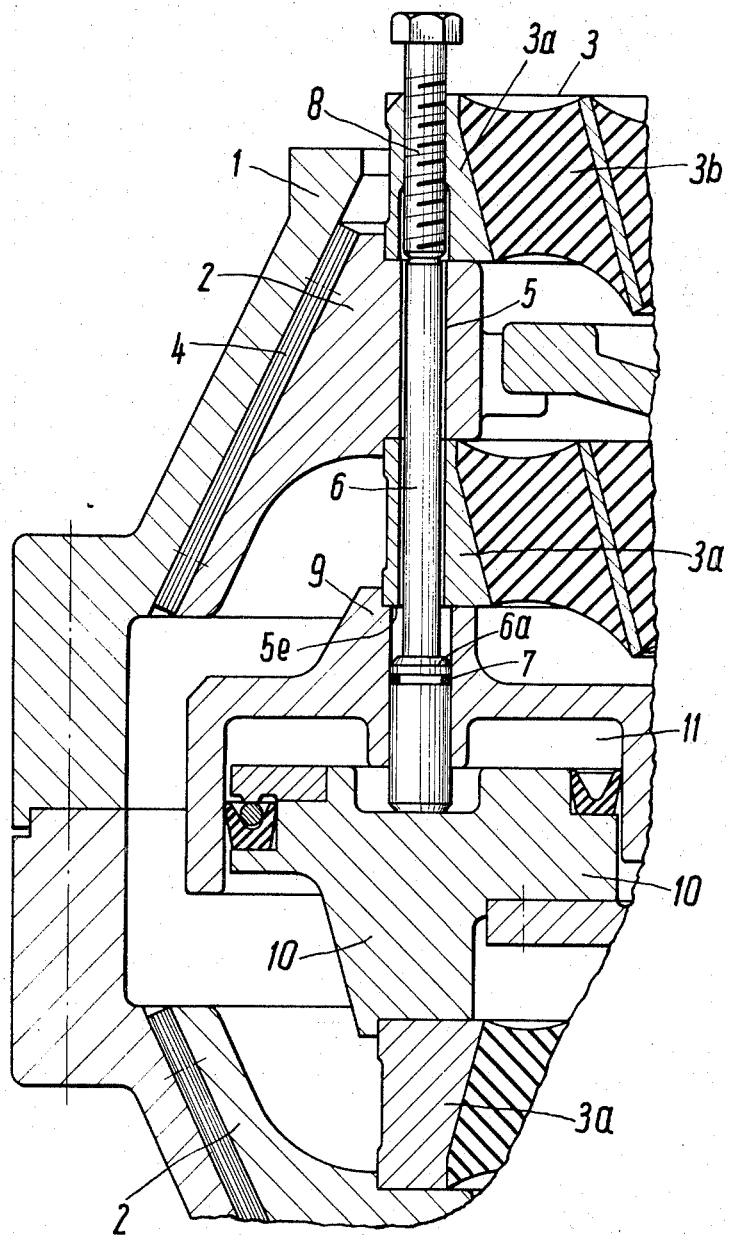
FIG. 3 illustrates a view similar to FIG. 2, both with operating emergency device.

Turning now to FIG. 3, there is illustrated the operational state of the clutch under emergency conditions.

For this, adjusting screws, such as 8, are threaded into threaded bore portion 5a. Upon turning a screw 8 the respective plunger 6 can be shifted within bore 5 so as to project into chamber 11 and brought into abutment with piston 10. Thus, upon turning bolt 8, piston and cylinder can be axially shifted relative to each other, and the clutch elements 2 and 2' can be correspondingly brought into engagement with the housing parts 1 and 1'.

In principle, one bore-plunger arrangement 5–6 suffices, but in order to prevent setting up a torque about an axis transverse to the system axis, i.e., in order to prevent tilting (and binding!) of the annular piston 10, plural, regularly distributed bore-plunger arrangements are provided. In the illustrated example, four such plungers are used to shift the piston 10 in chamber 11 independently from fluid pressure. As the several screws 8 can be tightened to a desired degree, the torque, as transmitted to the primary and secondary part of this particular clutch, is adjustable.

As can readily be seen, the emergency equipment merely needs to comprise of such actuator plungers, whose operation simulates the action of fluid pressure in the cylinder chamber, so that the clutch can be actuated analogously. Accordingly, the torque transmitting parts remain in operation, and particularly the frictional interaction of parts 1, 1' and 2, 2', as well as the resilient action of coupling 3, is not bypassed.

It is important that the adjusting screws 8 are available at all times, therefore, they are normally threadedly received in blind end bores 15 as provided in the one outer ring 3a and they are maintained therein until use becomes necessary.

This also leads to the point that the particular emergency equipment can be installed in already existing clutches. As can be seen, all that is necessary, is to provide these bores 5 in the one clutch part. The plungers are separate pins and will be inserted accordingly. The same is true for the adjusting screws 8. The blind bores 15, receiving the adjusting screws, are a great convenience for having the screws readily available under stand-by conditions. However, these bores could be dispensed with, if there is danger of weakening structure of an already existing clutch.

In the illustrated example, the plungers traverse the cylinder and act on the front face of the piston. The relation could be reversed, for the plungers to traverse the piston and to act on the cylinder. The essential feature is the mechanical spreading of the normally fluid pressure operated parts.

Figure 4:
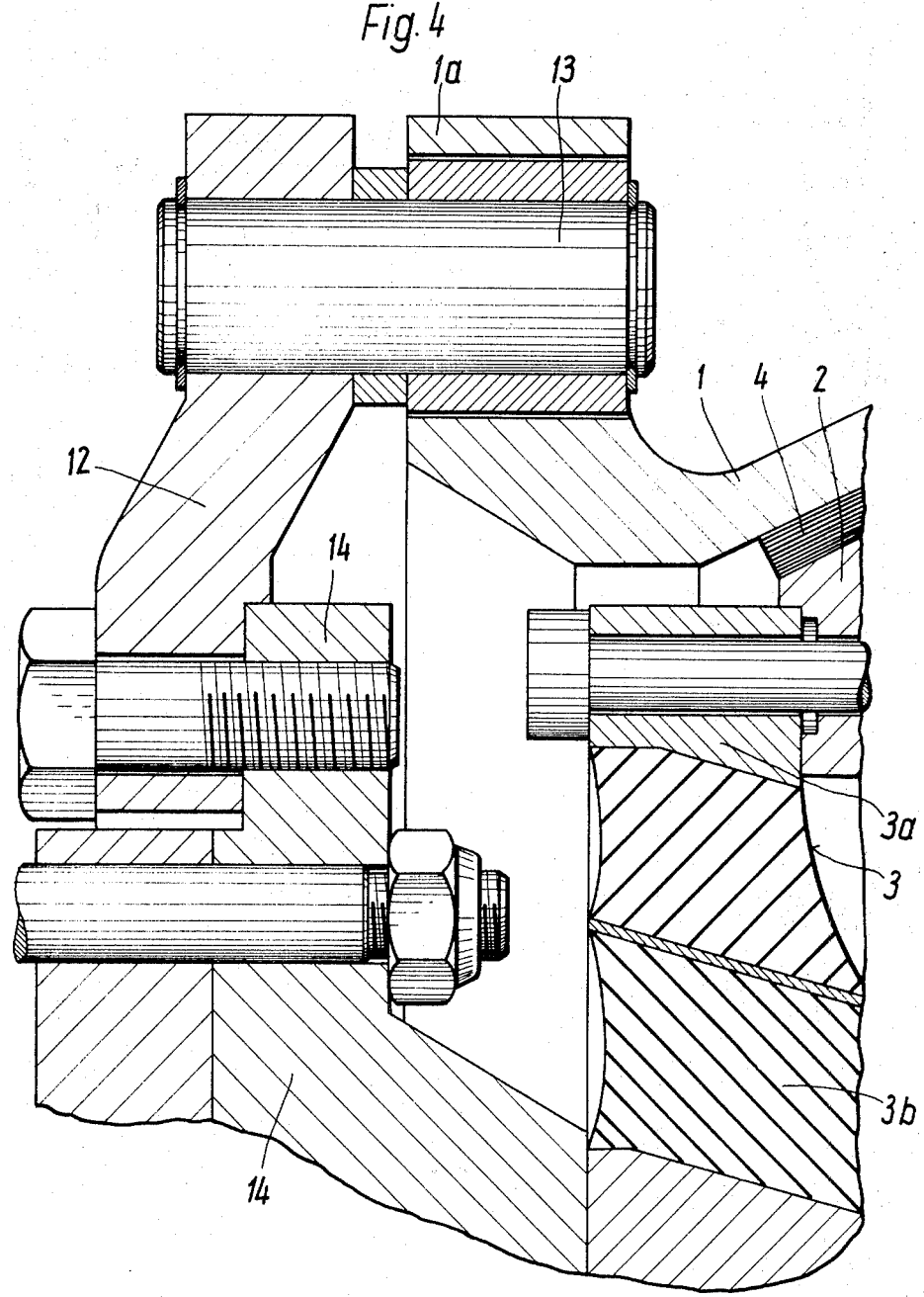
FIG. 4 is a partial section through a prior art emergency coupling.

In order to evaluate the advantages offered by the invention, the construction as described should be contrasted with a prior art emergency structure. FIG. 4 illustrates such an emergency equipment whereby the primary and input side of the elastic coupling is directly connected to the driven output side of the clutch, e.g., housing 1. For this purpose clutch housing 1 is provided with a particular additional flange 1a. The hub 22 of the clutch is provided with an extended flange 14, especially constructed and provided for that purpose. In case the clutch fails an intermediate flange 12 is bolted to flange 14, and a buffer bolt 13 establishes connection between flanges 12 and 1a. Of course, the elastic coupling element 3 is bypassed and no longer part of the torque transmission path. Unfortunately, the resiliency as between rotating parts within the clutch is drastically reduced. There is some resiliency bolts 13 will provide, but that is almost negligible. Also, the friction lining in the clutch is not acting any longer. Thus, this type of emergency device establishes what can be described as a quasi-rigid coupling between driving and driven parts bypassing actually the principle parts of the clutch. The invention as disclosed above, minimizes emergency intervention, the clutch remains operative as a whole.

The invention is not limited to the embodiments described above but all changes and modifications thereof not constituting departures from the spirit and scope of the invention are intended to be included.

I claim:

1. A pressure operated friction clutch having a double cone, outer clutch element with two inwardly directed conical surfaces, a pair of inner axially displaceable conical clutch elements in the outer clutch element, respectively having conical surfaces for frictionally engaging said two conical surfaces, resilient means connected for biasing the inner elements into a position of disengagement from the said conical surfaces of the outer element;

pressure means including a pressure chamber between the two inner clutch elements, enclosed by both of them, and connected for displacing the inner elements against the resilient bias for causing the inner elements to be frictionally coupled to the outer elements by means of said frictional engaging, the improvement comprising:

a plurality of axis-parallel bores in the one displaceable element arranged around the axis and terminating in said chamber, a plurality of plungers respectively sealingly placed in the bores of the plurality, each having a front end facing the respective other displaceable clutch element, each plunger having a rear end externally accessible through the respective bore, there being retaining means in the bores for preventing escape of the plungers towards the rear, pressure in the chamber holding the plungers against the retaining means; and adjusting screws for selective insertion in the bores for engagement of the rear end of the respective plunger in the bore and for causing the plunger to disengage from the retaining means and to have its front end engage the other inner clutch element for causing both said inner clutch elements to frictionally engage the outer clutch element independently from said pressure means.

2. The improvement as in claim 1, wherein the pressure medium operated clutch elements include an annular cylinder and piston arrangement, the plungers disposed for selective projection into the cylinder chamber for engagement with one of the piston and cylinder to obtain relative displacement between them.

3. The improvement as in claim 1, each of the bores and the respective plunger therein having annular shoulders which are mutually engaged, when the plunger is disengaged from the other clutch element.

4. The improvement as in claim 1, including additional threaded bores for normally receiving the screws when not inserted in the bores.

5. The improvement as in claim 2, the plural bores and plungers extending axially and the additional bores being disposed on a circle concentric to the annular piston and cylinder.

6. The improvement as in claim 1, wherein the retaining means include a shoulder with an annular edge of the respective bores, the plungers each having bevelled portions engaging the edge when subjected to pressure in said chamber.

* * * * *